United States Patent
Zhu

(10) Patent No.: US 11,485,360 B2
(45) Date of Patent: Nov. 1, 2022

(54) DYNAMIC SPEED LIMIT ADJUSTMENT SYSTEM BASED ON PERCEPTION RESULTS

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 347 days.

(21) Appl. No.: 16/839,575

(22) Filed: Apr. 3, 2020

(65) Prior Publication Data

US 2021/0309223 A1    Oct. 7, 2021

(51) Int. Cl.
| | |
|---|---|
| *B60W 30/16* | (2020.01) |
| *B60W 30/14* | (2006.01) |
| *B60W 60/00* | (2020.01) |
| *G01S 13/72* | (2006.01) |
| *G05D 1/02* | (2020.01) |

(52) U.S. Cl.
CPC ........ *B60W 30/162* (2013.01); *B60W 30/146* (2013.01); *B60W 60/0027* (2020.02); *G01S 13/726* (2013.01); *B60W 2554/802* (2020.02); *B60W 2720/10* (2013.01); *G05D 1/0223* (2013.01)

(58) Field of Classification Search
None
See application file for complete search history.

(56) References Cited

U.S. PATENT DOCUMENTS

| | | | | |
|---|---|---|---|---|
| 8,428,842 | B2* | 4/2013 | Yasui | B60W 30/143 180/170 |
| 9,085,301 | B2* | 7/2015 | Taguchi | B60W 30/143 |
| 9,272,621 | B2* | 3/2016 | Sujan | B60K 31/00 |
| 10,496,099 | B2* | 12/2019 | Wilkinson | G05D 1/0223 |
| 10,642,275 | B2* | 5/2020 | Silva | G05D 1/024 |
| 10,725,475 | B2* | 7/2020 | Yang | G05D 1/0221 |
| 10,896,334 | B2* | 1/2021 | Nayak | G06V 10/82 |
| 10,940,859 | B2* | 3/2021 | Kleemann | B60W 60/00 |
| 11,048,265 | B2* | 6/2021 | Silva | G01S 17/89 |
| 11,294,388 | B2* | 4/2022 | Yang | G05D 1/0221 |
| 2010/0082216 | A1* | 4/2010 | Yasui | B60K 31/0066 701/93 |

(Continued)

FOREIGN PATENT DOCUMENTS

| | | | | |
|---|---|---|---|---|
| CN | 102762428 | A * | 10/2012 | B60W 30/143 |
| CN | 102762428 | B * | 1/2016 | B60W 30/143 |

(Continued)

*Primary Examiner* — Kevin R Steckbauer
(74) *Attorney, Agent, or Firm* — Womble Bond Dickinson (US) LLP

(57) ABSTRACT

In one embodiment, a method of adjusting a speed limit of an ADV includes the operations of tracking objects within a field of view of the ADV; and identifying a set of stable objects from the objects tracked by the ADV based on a set of requirements. The method further includes the operations of identifying a subset of objects from the set of stable objects, the subset of objects having longest distances to the ADV; calculating a detection distance by averaging distances from the subset of stable obstacles to the ADV; and adjusting the speed limit of the ADV based on the detection distance using a predetermined algorithm.

20 Claims, 7 Drawing Sheets

(56) References Cited

U.S. PATENT DOCUMENTS

| | | | | |
|---|---|---|---|---|
| 2012/0022764 A1* | 1/2012 | Tang | ................. | B60W 50/0097 701/102 |
| 2012/0215415 A1* | 8/2012 | Schramm | .............. | B60W 30/16 701/93 |
| 2013/0013164 A1* | 1/2013 | Taguchi | ............ | B60W 50/0097 701/96 |
| 2015/0306957 A1* | 10/2015 | Sujan | ................ | B60W 50/0097 701/94 |
| 2019/0025843 A1* | 1/2019 | Wilkinson | ........... | G05D 1/0223 |
| 2019/0310648 A1* | 10/2019 | Yang | ....................... | G06N 20/20 |
| 2019/0315354 A1* | 10/2019 | Kleemann | ........... | B60W 30/1843 |
| 2019/0384302 A1* | 12/2019 | Silva | ..................... | G05D 1/0248 |
| 2019/0384309 A1* | 12/2019 | Silva | ..................... | G01S 17/931 |
| 2020/0167575 A1* | 5/2020 | Nayak | ..................... | H04W 4/44 |
| 2020/0225672 A1* | 7/2020 | Silva | ....................... | G01S 17/89 |
| 2020/0257303 A1* | 8/2020 | Yang | ....................... | G06N 20/20 |
| 2021/0024066 A1* | 1/2021 | Hornstein | ........... | B60W 50/085 |
| 2021/0276563 A1* | 9/2021 | Heitzmann | ........... | G01S 7/4814 |
| 2021/0309223 A1* | 10/2021 | Zhu | ....................... | G01S 13/726 |
| 2022/0119016 A1* | 4/2022 | Rajvanshi | ............ | B60W 30/12 |
| 2022/0135079 A1* | 5/2022 | Ito | ..................... | B60W 60/0018 701/23 |

FOREIGN PATENT DOCUMENTS

| | | | | | |
|---|---|---|---|---|---|
| CN | 106467106 | A | * | 3/2017 | ............ B60W 10/06 |
| CN | 106467113 | A | * | 3/2017 | ............ B60W 30/16 |
| CN | 108583582 | A | * | 9/2018 | ............ B60W 30/14 |
| CN | 108819942 | A | * | 11/2018 | ............ B60W 30/16 |
| CN | 110194161 | A | * | 9/2019 | ............ B60W 30/14 |
| CN | 110364006 | A | * | 10/2019 | ......... B62D 15/0255 |
| CN | 110435629 | A | * | 11/2019 | ............ B60W 30/14 |
| CN | 108819942 | B | * | 12/2020 | ............ B60W 30/16 |
| CN | 112416004 | A | * | 2/2021 | ............ G05D 1/0214 |
| CN | 113044042 | A | * | 6/2021 | ............ B60W 40/06 |
| CN | 113044042 | B | * | 9/2021 | ............ B60W 40/06 |
| CN | 110364006 | B | * | 1/2022 | ......... B62D 15/0255 |
| DE | 102011012096 | A1 | * | 8/2012 | ............ B60W 30/143 |
| DE | 102017205893 | A1 | * | 10/2017 | ............ B60W 40/04 |
| DE | 102018208910 | A1 | * | 12/2019 | ............... B60Q 1/34 |
| DE | 102020102328 | A1 | * | 8/2021 | ............ B60W 30/08 |
| EP | 2168806 | A2 | * | 3/2010 | ......... B60K 31/0066 |
| EP | 2168806 | B1 | * | 12/2012 | ......... B60K 31/0066 |
| EP | 3519267 | B1 | * | 7/2020 | ............ B60W 40/04 |
| ES | 2371523 | T3 | * | 1/2012 | ................. B60T 7/22 |
| FR | 3056532 | A1 | * | 3/2018 | ............ B60W 40/04 |
| GB | 2488398 | A | * | 8/2012 | ............ B60W 30/143 |
| JP | 3802944 | B2 | * | 8/2006 | ......... B60K 31/0008 |
| JP | 3860239 | B2 | * | 12/2006 | ......... B60K 31/0008 |
| JP | 2010076695 | A | * | 4/2010 | ......... B60K 31/0066 |
| JP | WO2011101949 | A1 | * | 8/2011 | ............ B60W 30/143 |
| JP | 5279429 | B2 | * | 9/2013 | ......... B60K 31/0066 |
| JP | 5598531 | B2 | * | 10/2014 | ............ B60W 30/143 |
| KR | 20200006701 | A | * | 1/2020 | ............ B60W 40/04 |
| WO | WO-2011101949 | A1 | * | 8/2011 | .......... B60W 30/143 |
| WO | WO-2018060379 | A1 | * | 4/2018 | ............ B60W 40/04 |
| WO | WO-2019018471 | A1 | * | 1/2019 | ......... G01C 21/3407 |

* cited by examiner

DYNAMIC SPEED LIMIT ADJUSTMENT SYSTEM BASED ON PERCEPTION RESULTS

TECHNICAL FIELD

Embodiments of the present disclosure relate generally to operating autonomous vehicles. More particularly, embodiments of the disclosure relate to adjusting speed limits of an autonomous driving vehicle based on a perceived environment.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

A vehicle operating in an autonomous mode, also referred to an autonomous driving vehicle (ADV), can adjust its speed limit based on information on a high definition map. However, the information on a high definition map is typically static; and adjusting the speed limits of an ADV based on such information may not always work, since weather conditions and dynamic traffic conditions may impact the perception range of the ADV.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
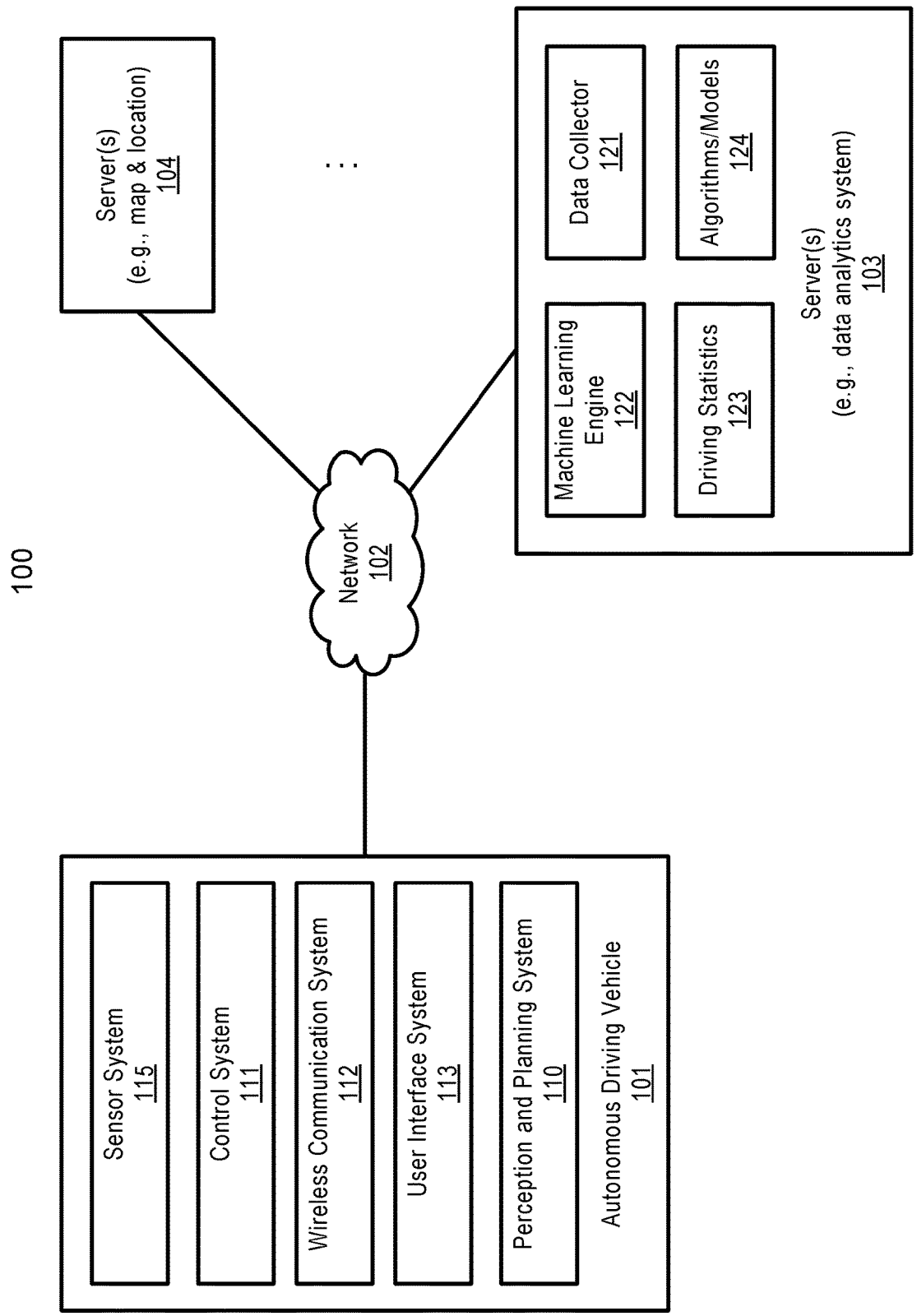
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, described herein are systems and methods for adjusting speed limits of an autonomous driving vehicle (ADV) based on a detection distance calculated based on perceived objects in front of the ADV. In one embodiment, an exemplary method of adjusting speed limits of an ADV includes the operations of tracking objects within a field of view of the ADV; and identifying a set of stable objects from the objects tracked by the ADV based on a set of requirements. The method further includes the operations of identifying a subset of objects from the set of stable objects, where the subset of objects has longest distances to the ADV; calculating a detection distance by averaging distances from the subset of stable obstacles to the ADV; and adjusting the speed limit of the ADV based on the detection distance using a predetermined algorithm.

In one embodiment, the ADV can determine a temporary stable perception distance (also referred to as a detection distance) by tracking objects within the field of view of the ADV. The ADV can track each object that appears within the field of view of the ADV for a number of driving cycles (e.g., 10 driving cycles). The ADV can track each object by its identifier, and determine whether the object is stable based on the following requires, namely, whether the bounding box of the object changes its size within a predetermined range, whether the position and speed of the object in any driving cycle (except the first driving cycle) of the ADV changes by a percentage exceeding a threshold when comparing with the immediately preceding driving cycle, and whether the type of the object as perceived by the ADV remains the same throughout the predetermined number of driving cycles of the ADV. If any of the above requirements is not met for an object, the ADV would count the object as a new object.

In one embodiment, for each tracked object, the ADV can record the absolute Euclidean distance of the object to the ADV when the object first appears within the field of view of the ADV, for example, in the first driving cycle that the ADV begins to track the object.

In each of the remaining driving cycles other than the first driving cycle, the ADV will not record the distance of the object to the ADV; the remaining driving cycles are used to determine whether the object can be stably tracked so that it can be used as a candidate object for calculating the detection distance.

In one embodiment, the detection distance is an average of distance calculated from the recorded distances for a number of the objects that can be stably tracked. The number of stabled tracked objects used for calculating the detection distance is a subset of the objects that meet the requirements for determining whether an object can be stably tracked. For one example, the number of objects used for calculating the detection distance are objects that have the longest distances from the ADV.

Therefore, the calculated detection distance at any particular moment represents a stable perception distance of the ADV under the existing environment (e.g., weather conditions and traffic) on the road in front of the ADV. Using a group of objects rather than a single object to determine the detection distance leads to a more accurate detection distance.

In one embodiment, the ADV can adjust its speed limit using a predetermined algorithm, which can be based on a number of factors, including a number of seconds for the ADV to start slowing down, a deceleration, and the detection distance.

The above summary does not include an exhaustive list of all aspects of the present invention. It is contemplated that the invention includes all systems, computer media, and methods that can be practiced from all suitable combinations of the various aspects summarized above, and also those disclosed below.

Autonomous Driving Vehicle

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
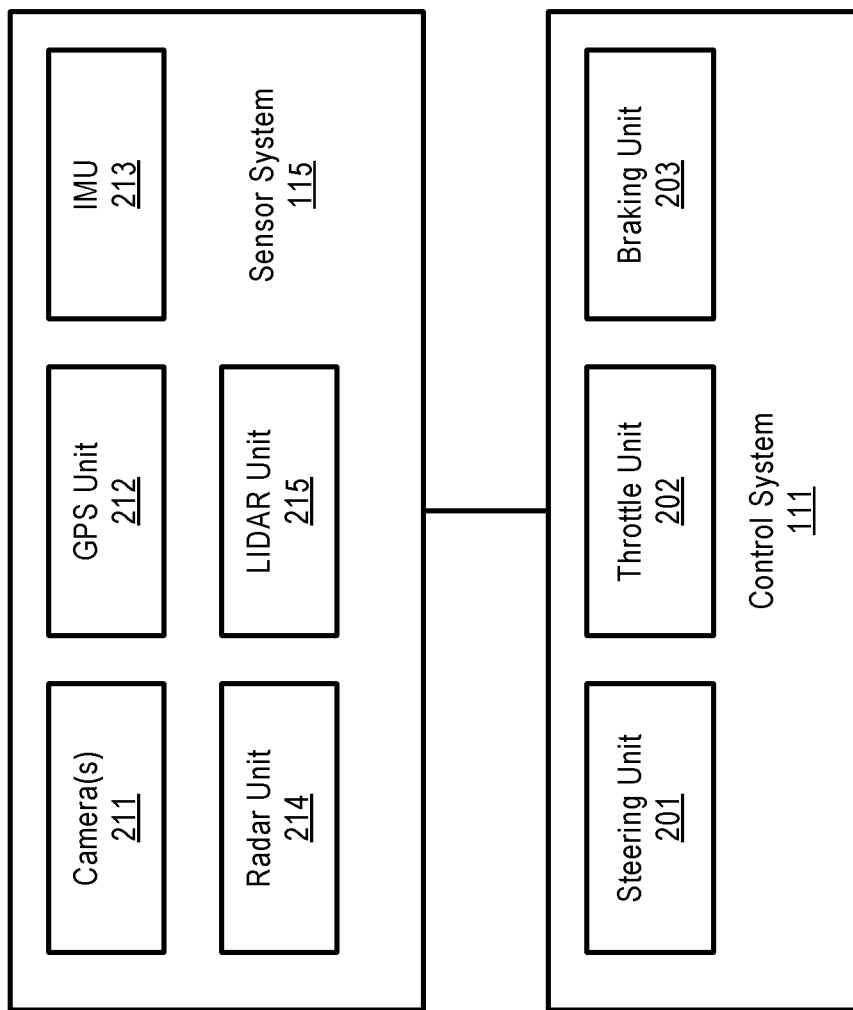
FIG. 2 is a block diagram illustrating an example of an autonomous vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include a speed limit adjustment algorithm, which will be described in details further below. Algorithms 124 can then be uploaded on ADVs to be utilized during autonomous driving in real-time.

Figure 3A:
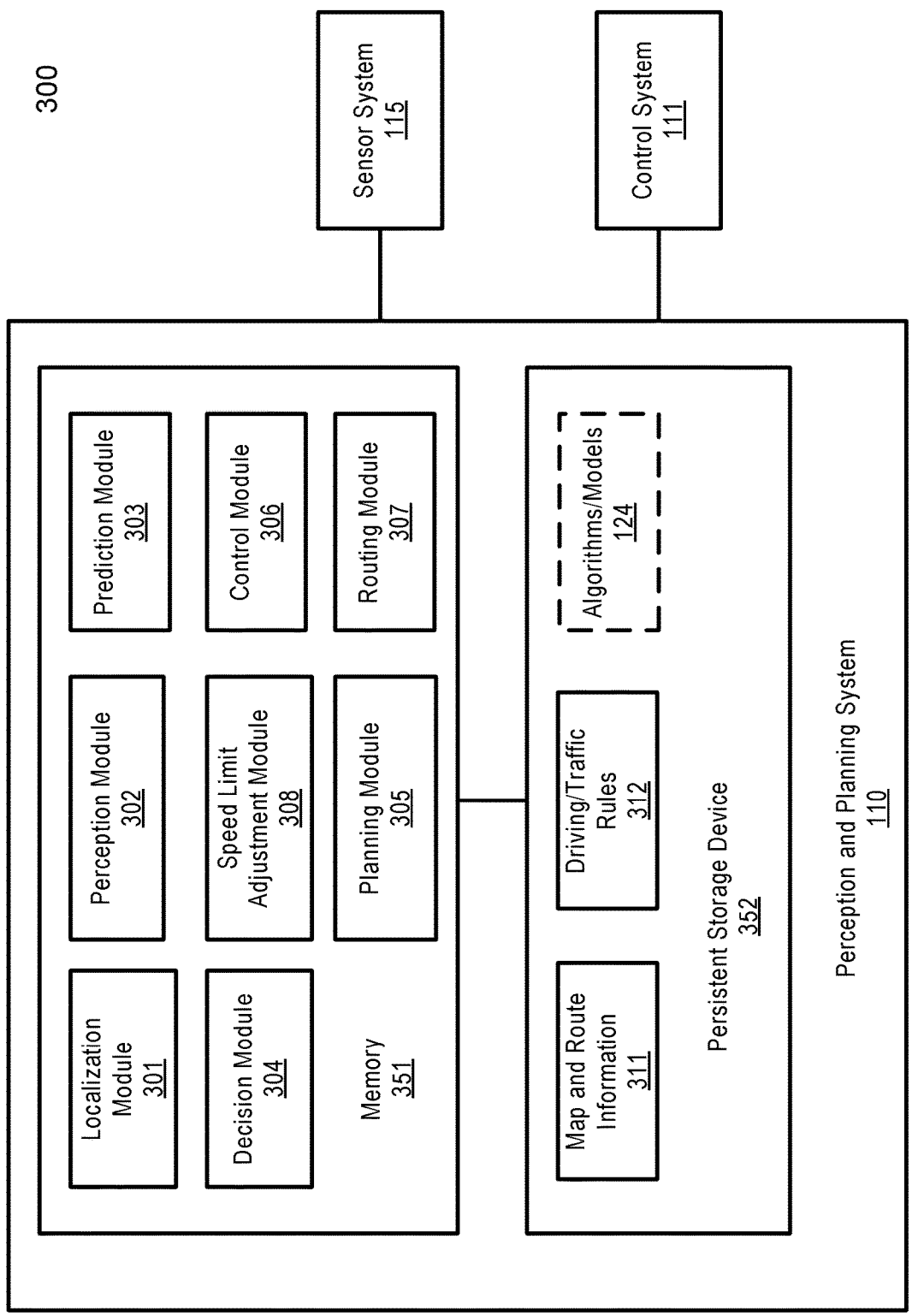
FIGS. 3A-3B are block diagrams illustrating an example of a perception and planning system used with an autonomous vehicle according to one embodiment.
Figure 3B:
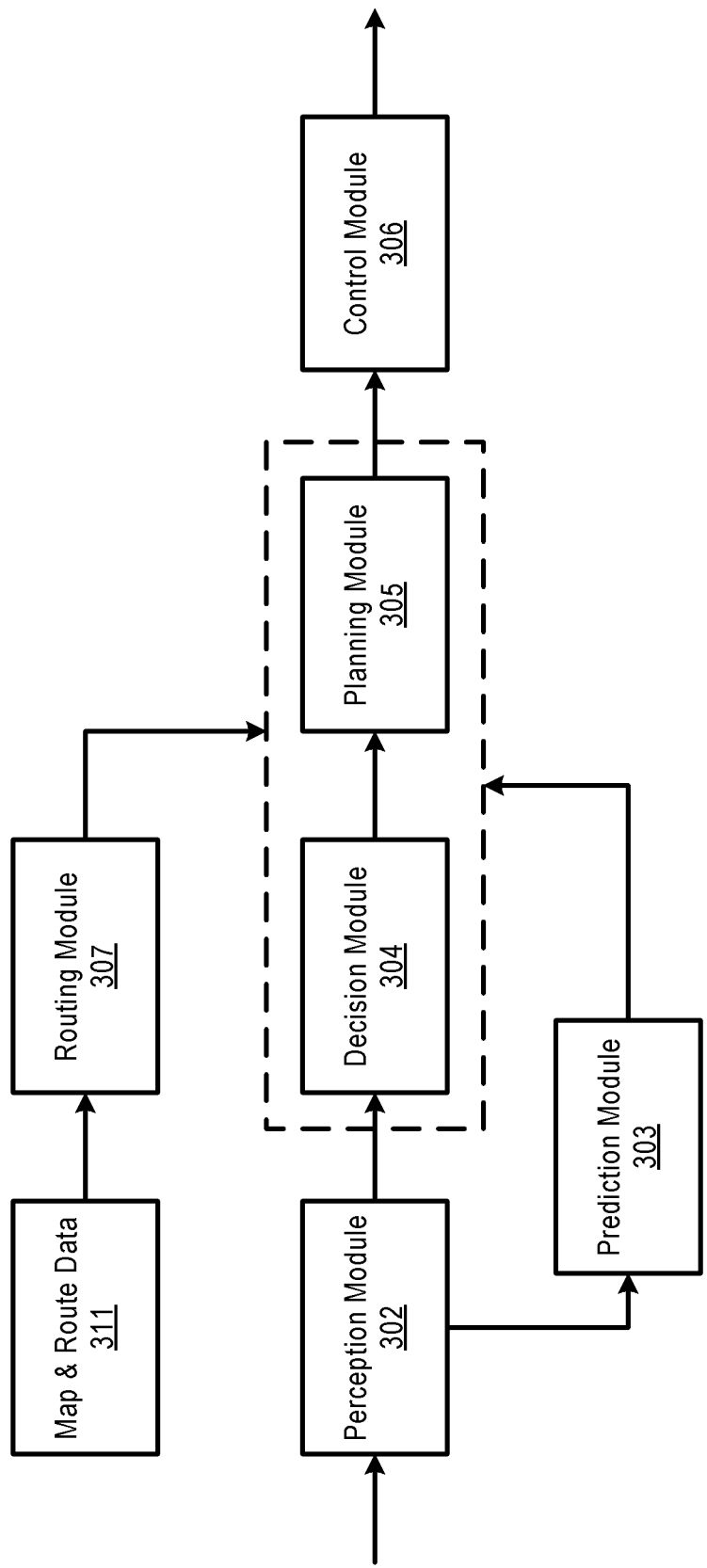

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and speed limit adjustment module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Speed limit adjustment module 308 can generate a detection distance based on perceived objects in front of the ADV and use the detection distance to adjust the speed limit of the ADV. Speed limit adjustment module 308 may be implemented as a separate module or alternatively, it may be integrated with any one of the modules 301-307, such as, for example, planning module 305. The detailed operations of speed limit adjustment module 308 will be described further below.

Detection Distance

In one embodiment, a detection distance can be calculated, for example, by speed limit adjustment module 308, and can be used by the ADV to dynamically adjust its speed limit. The detection distance can be a clear perception distance of the ADV at any given time under the existing natural conditions and traffic conditions.

The detection distance is calculated based on multiple objects that can be stably tracked for a predetermined number of driving cycles. Therefore, for at least the predetermined number of driving cycles, the multiple objects represent a clear detection range for the ADV.

The detection distance can dynamically change since the natural conditions (e.g., foggy date, raining day, etc.) and the traffic conditions of the road will dynamically change. Therefore, the calculation of detection distances is a continuous process.

Figure 4:
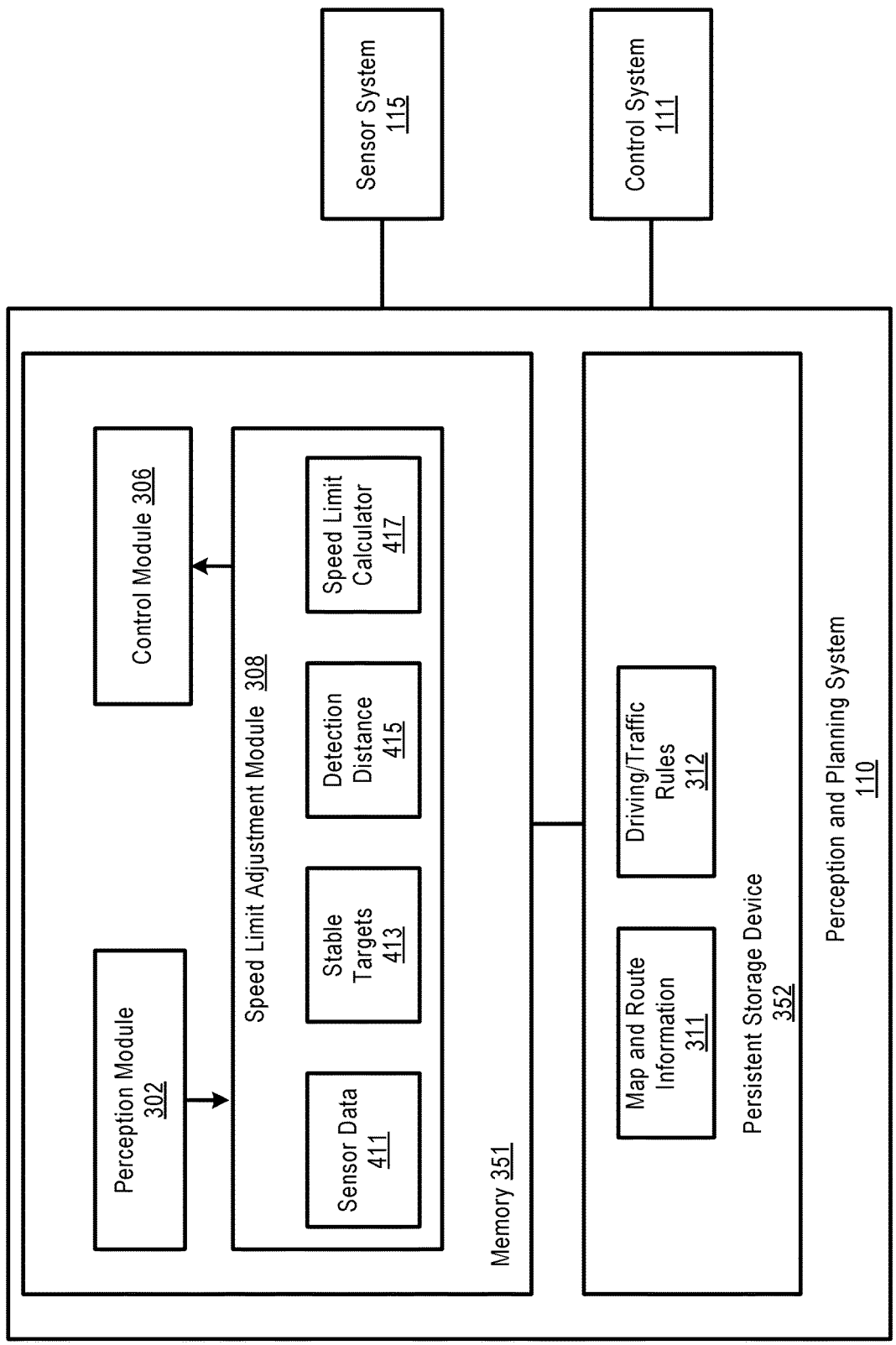
FIG. 4 is a block diagram illustrating an example of a system for adjusting a speed limit of the ADV according to one embodiment.

FIG. 4 is a block diagram illustrating an example of a system for adjusting a speed limit of the ADV according to one embodiment. As shown in FIG. 4, the speed limit adjustment module 308 can receive sensor data 411 from the perception module 302. The sensor data 411 can include an identifier (ID) for each object within the field of view of the sensor system 115 of the ADV, a speed of the object, a position of the object, and information for a bounding box and a polygon surrounding each object.

The speed limit adjustment module 308 can obtain such sensor data from the perception module 302 for each object (also referred to as an obstacle) within a predetermined proximity such as the field of view of the ADV. From the sensor data 411, the speed limit adjustment module 308 can identify objects 413 that can be stably tracked for a number of driving cycles, e.g., 10 driving cycles.

For an object to be classified as a stably tracked object, according to one embodiment, the object needs to meet one or more of the following requirements: (1) a change in a size of a bounding box for the object is less than a threshold; (2) a change in a position of the object between two adjacent driving cycles (except between the first and the second driving cycles) does not exceed a threshold; (3) a type of the object perceived by the ADV remains the same throughout the predetermined number of driving cycles; and/or (4) the speed of the object between two adjacent driving cycles (except between the first driving cycle and the second driving cycle) does not exceed a threshold. In one embodiment, during the first driving cycle of the predetermined number of driving cycle, the object just appears within the FOV of the ADV, which may not have enough information or time to determine the speed or location of the object yet.

In one embodiment, the perception module 302 can generate a bounding box and a polygon for each object being tracked by the ADV. The polygon is a plane figure for representing the object in the perception module 302, while the bounding box is a 3-D representation of the object. Tracking an object by its polygon representation is problematic because the object may appear differently to the ADV from different angles. Tracking an object by its bounding box does not have the problem, since the ADV can identify a bounding box from any angle. As such, in this embodiment, the ADV track the bounding box of an object, not its polygon. The farther away the object is from the ADV, the smaller the bounding box is. If the size of the bounding box of an object does not change drastically, the object can be considered relatively stable.

According to one of the requirements, changes in the size of the bounding box for an object needs to be less than a threshold, for example, 20 percent. For an object to be considered stably tracked, the change in the size of the bounding box for the object between two adjacent driving cycles of the ADV needs to be less than 20 percent. According to another requirement, the change in the position of the object throughout the predetermined number of driving cycles also needs to be less than a threshold (e.g., 20 percent). Although the speed limit adjustment module only records the distance of the object during the first driving cycle of the ADV, the position of the object in each driving cycle can be estimated based on the recorded position during the first driving cycle, and a number of driving parameters and commands, including the current speed and the heading of the ADV.

In one embodiment, the perception module 402 may classify tracked objects into different types, examples of which include an unknown object type, a bus, a car, and a pedestrian. When an object is too far away from the ADV, the ADV may classify the object as an unknown type, since the ADV does not know what it is. As the ADV moves closer to the object, the ADV can obtain sufficient information to classify the object into a different type (e.g., a bus). As one of the requirements for determining whether an object is stably tracked, the object needs to remain the same type as perceived by the ADV throughout the predetermined number of driving cycles.

In one embodiment, another requirement for determining whether an object is stably tracked is that a change of the speed of the object between two adjacent driving cycles (except between the first driving cycle and the second driving cycle) stays below a predetermined threshold. For example, the change between two consecutive driving cycle needs to be less than 20%.

In on embodiment, for each tracked object, the ADV can record the absolute Euclidean distance of the object to the ADV when the object first appears within the field of view of the ADV, for example, in the first driving cycle of the predetermined number of driving cycle. In each of the remaining driving cycles, the ADV will not record the distance of the object to the ADV; the remaining driving cycles are used to determine whether the object can be stably tracked so that it can be used as a candidate object for calculating the detection distance.

As shown in FIG. 4, in one embodiment, the speed limit adjustment module 308 can identify a number of objects 413 as stably tracked, where each stably tracked object meet one or more of the above specified 4 requirements. In an alternative embodiment, an object is not classified as a stably tacked object unless the object meets each and every of the above four requirements.

In one embodiment, the speed limit adjustment module 308 can select a subset of the stably tracked objects 413 to calculate a detection distance 415. In one embodiment, the subset of objects selected for calculating the detection distance can be a predetermined number (e.g., 5) of the stable objects that have the longest distances from the ADV. In another embodiment, the subset of objects selected for calculating the detection distance can be selected based on a distribution model, and only those objects that falls within a particular distribution range are selected.

The detection distance 415 can be used by a speed limit calculator 417 to adjust a speed limit of the ADV. In one embodiment, the speed limit calculator can implement an algorithm, an example of which can be expressed using the following inequality equation:

$$\text{Speed\_limit}*1 \ s + \text{speed\_limit}^2/2*\text{abs}(\text{deceleration}) < \text{detection distance}.$$

In the above inequality equation, "Speed_limit" is the desired speed limit of the ADV based on the detection distance, "abs (deceleration)" is the absolute value of the deceleration of the ADV, and "detection distance" is the detection distance 415 calculated by the speed limit adjustment module 308.

According to the above inequality equation, the control module 306 would adjust the speed limit of the ADV based on the detection distance and the deceleration capacity of the ADV. The speed limit would enable the ADV to fully stop before a static obstacle given the detection range, and given that the ADV takes one second to start to slow down (i.e., the ADV would travel at the speed limit during the one second) and uses a deceleration capacity of $-2 \text{ m/s}^2$. In one embodiment, speed limit adjustment module 308 may be implemented as a part of planning module 305, particularly, during a speed planning process.

Figure 5:
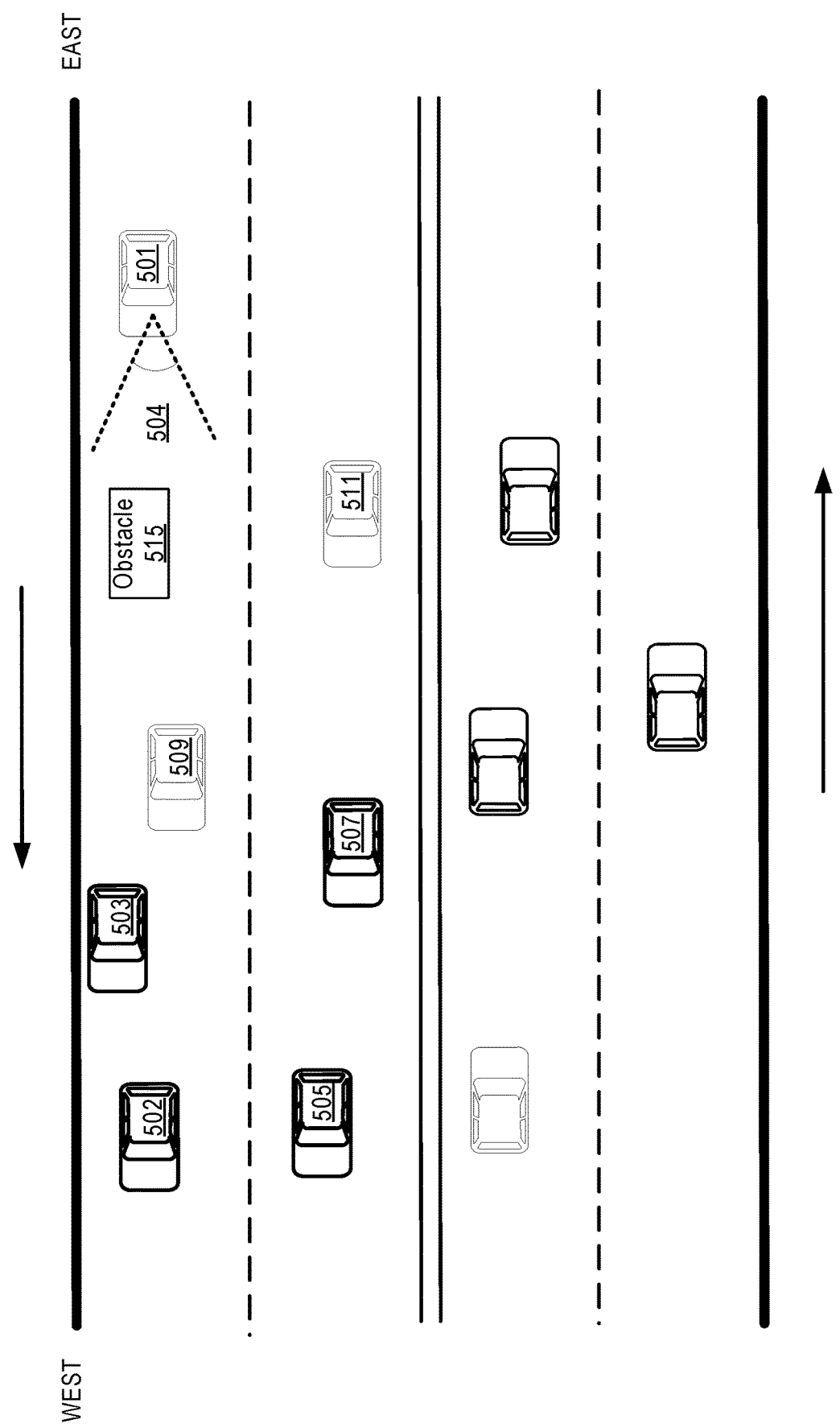
FIG. 5 illustrates an example of a driving scenario for adjusting a speed limit based on a detection distance according to one embodiment.

FIG. 5 illustrates an example of a driving scenario for adjusting a speed limit based on a detection distance according to one embodiment. As shown in FIG. 5, an ego ADV

501 is travelling on a four-lane road from east to west. Instead of relying on static information on a high definition to adjust its speed limit, the ego ADV 501 can estimate its perception range based on traffic in front of the ego AD 501. The perception range (also referred to detection range in this disclosure) is a dynamic detection range that can be constantly calculated.

In one embodiment, the ego ADV 501 can track each object within its field of view (FOV) 504. In FIG. 5, the objects being tracked by the ego ADV 501 include a number of vehicles 502, 503, 505, 507, 509, and 515. In one embodiment, the ego ADV 501 can track each object for 10 driving cycles, and record a distance of the object to the ego ADV 501 during the first driving cycle of the ADV.

In one embodiment, for an object to be considered stably tracked, the object must be tracked by the ADV for at least 10 driving cycles, and meet one or more of the above requirements described above in FIG. 4.

As described in FIG. 4, throughout the 10 driving cycles, the ego ADV 501 can track changes in the size of the bounding box for each object, changes in the position of the object between two adjacent driving cycles (except between the first driving cycle and the second driving cycle), the type of the object, and changes in the speed of the object between two adjacent driving cycles (except between the first driving cycle and the second driving cycle). Based on the information obtained from the objects being tracked and a number of predefined requirements, the ego ADV 501 can identify a number of objects that are considered stable.

As an illustration, the vehicles 502, 503, 507 and 509 are tracked for at least 10 driving cycles, and also meets at least one of the above requirements. Therefore, the objects are classified as stably tracked objects. Some objects (e.g., a vehicle 511) is not within the FOV 504 and therefore is to be tracked by the ego ADV 501. Some other objects (e.g., a vehicle 515) appears in the FOV 504 of the ego ADV for less than 10 driving cycles and is also not considered stable tracked. The ego ADV 501 can select a subset of the stably tracked objects to calculate a detection range of the ego ADV 501 for a brief period of time (e.g., 10 driving cycles).

In one example, the subset of objects can include the vehicles 502, 503, 505 and 507. The subset of objects may be selected based on one or more rules. For example, the subset of objects can be those stably tracked objects that have the longest distances from the ego ADV 501. The distance for each of the subset of objects can be the distance recorded during the first driving cycle that the ego ADV tracks the object.

In one embodiment, the ego ADV 501 may not always be able to identify a set of stably tracked objects, and then select a subset from the stably tracked objects to calculate a detection distance at any moment. For example, sometimes on the four-lane road, there may not be any object for the ADV to track for at least 10 driving cycles. In such a scenario, the ego ADV 501 may set its speed limit using other mechanisms.

Embodiments of the invention described herein are for a driving scenario where traffic in front of the ego ADV 501 can be stably tracked, so that that the ego ADV 501 can use the traffic to determine its perception range for that driving scenario. Based on the perception range, and the deceleration capacity of the ego ADV 501, the ego ADV 501 can accordingly adjust speed limit, such that the ego ADV 501 can fully before a static obstacle 5101 when such static obstacle is suddenly detected.

Figure 6:
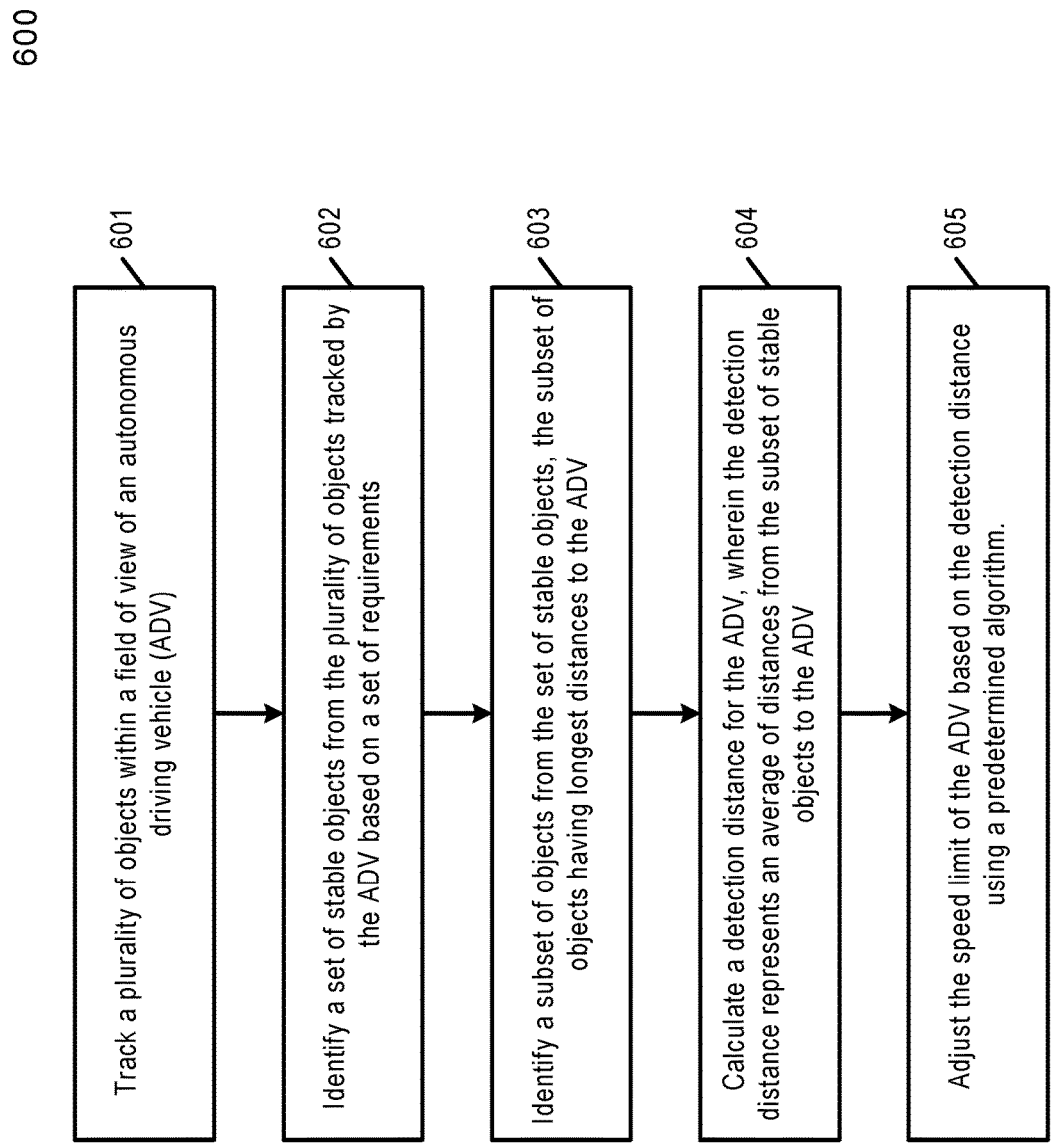
FIG. 6 is a block diagram illustrating an example of a process for adjusting a speed limit of the ADV according to one embodiment.

FIG. 6 is a block diagram illustrating an example of a process 600 for adjusting a speed limit of the ADV according to one embodiment. Process 600 may be performed by processing logic which may include software, hardware, or a combination thereof. For example, process 800 may be performed by the speed limit adjustment module 308 described in FIG. 4.

Referring to FIG. 6, in operation 601, the processing logic tracks a number of objects within a field of view of an autonomous driving vehicle (ADV). In operation 602, the processing logic identifies a set of stable objects from the number of objects tracked by the ADV based on a set of requirements. In operation 603, the processing logic identifies a subset of objects from the set of stable objects, the subset of objects having longest distances to the ADV. In operation 604, the processing logic calculates a detection distance for the ADV. The detection distance represents an average of distances from the subset of stable objects to the ADV. In operation 605, the processing logic adjusts the speed limit of the ADV based on the detection distance using a predetermined algorithm.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of adjusting a speed limit of an autonomous driving vehicle (ADV), comprising:
   tracking a plurality of objects within a field of view of the ADV;
   identifying a set of stable objects from the plurality of objects tracked by the ADV based on a set of requirements;
   identifying a subset of objects from the set of stable objects, the subset of objects having longest distances to the ADV;
   calculating a detection distance for the ADV, wherein the detection distance represents an average of distances from the subset of stable objects to the ADV; and
   adjusting the speed limit of the ADV based on the detection distance using a predetermined algorithm.

2. The method of claim 1, wherein the ADV tracks each of the plurality of objects for a preset number of driving cycles, wherein the ADV records a distance of each object to the ADV during a first driving cycle of the preset number of driving cycles.

3. The method of claim 2, wherein each of the distances used for calculating the detection distance is a distance from one of the set of stable objects to the ADV recorded during the first driving cycle of the preset number of driving cycles during which the ADV tracks one of the set of stable objects.

4. The method of claim 2, wherein the set of requirements include one or more of the following:
   that a change in a size of a bounding box for an object is less than a first threshold;
   that a change in a position of the object from a first driving cycle to a second driving cycle does not exceed a second threshold;
   that a type of the object perceived by the ADV remains the same throughout the preset number of driving cycles; or
   that a speed of the object from the first driving cycle to the second driving cycle does not exceed a fourth threshold.

5. The method of claim 4, wherein each of the plurality of tracked objects has an associated identifier.

6. The method of claim 1, wherein the predetermined algorithm is based on a plurality of factors, including a number of seconds for the ADV to start slowing down, a deceleration, and the detection distance.

7. The method of claim 1, wherein the detection distance represents a clear range in which there is no moving object between the ADV and the subset of stable objects for at least one second.

8. A non-transitory machine-readable medium having instructions stored therein, which when executed by a processor, cause the processor to perform operations, the operations comprising:
   tracking a plurality of objects within a field of view of an autonomous driving vehicle (ADV);
   identifying a set of stable objects from the plurality of objects tracked by the ADV based on a set of requirements;
   identifying a subset of objects from the set of stable objects, the subset of objects having longest distances to the ADV;
   calculating a detection distance for the ADV, wherein the detection distance represents an average of distances from the subset of stable objects to the ADV; and
   adjusting a speed limit of the ADV based on the detection distance using a predetermined algorithm.

9. The non-transitory machine-readable medium of claim 8, wherein the ADV tracks each of the plurality of objects for a preset number of driving cycles, wherein the ADV records a distance of each object to the ADV during a first driving cycle of the preset number of driving cycles.

10. The non-transitory machine-readable medium of claim 9, wherein each of the distances used for calculating the detection distance is a distance from one of the set of stable objects to the ADV recorded during the first driving cycle of the preset number of driving cycles during which the ADV tracks one of the set of stable objects.

11. The non-transitory machine-readable medium of claim 9, wherein the set of requirements include one or more of the following:
   that a change in a size of a bounding box for an object is less than a first threshold;
   that a change in a position of the object from a first driving cycle to a second driving cycle does not exceed a second threshold;
   that a type of the object perceived by the ADV remains the same throughout the preset number of driving cycles; and
   that a speed of the object from the first driving cycle to the second driving cycle does not exceed a fourth threshold.

12. The non-transitory machine-readable medium of claim 11, wherein each of the plurality of tracked objects has an associated identifier.

13. The non-transitory machine-readable medium of claim 8, wherein the predetermined algorithm is based on a plurality of factors, including a number of seconds for the ADV to start slowing down, a deceleration, and the detection distance.

14. The non-transitory machine-readable medium of claim 8, wherein the detection distance represents a clear range in which there is no moving object between the ADV and the subset of stable objects for at least one second.

15. A data processing system, comprising:
   a processor; and a memory coupled to the processor to store instructions, which when executed by the processor, cause the processor to perform operations, the operations including tracking a plurality of objects within a field of view of an autonomous driving vehicle (ADV), identifying a set of stable objects from the plurality of objects tracked by the ADV based on a set of requirements, identifying a subset of objects from the set of stable objects, the subset of objects having longest distances to the ADV, calculating a detection distance for the ADV, wherein the detection distance represents an average of distances from the subset of stable objects to the ADV, and adjusting a speed limit of the ADV based on the detection distance using a predetermined algorithm.

16. The system of claim 15, wherein the ADV tracks each of the plurality of objects for a preset number of driving cycles, wherein the ADV records a distance of each object to the ADV during a first driving cycle of the preset number of driving cycles.

17. The system of claim 16, wherein each of the distances used for calculating the detection distances is a distance from one of the set of stable objects to the ADV recorded during the first driving cycle of the preset number of driving cycles during which the ADV tracks one of the set of stable objects.

18. The system of claim 16, wherein the set of requirements include one or more of the following:

that a change in a size of a bounding box for an object is less than a first threshold;

that a change in a position of the object from a first driving cycle to a second driving cycle does not exceed a second threshold;

that a type of the object perceived by the ADV remains the same throughout the preset number of driving cycles; and that a speed of the object from the first driving cycle to the second driving cycle does not exceed a fourth threshold.

19. The system of claim 18, wherein each of the plurality of tracked objects has an associated identifier.

20. The system of claim 15, wherein the predetermined algorithm is based on a plurality of factors, including a number of seconds for the ADV to start slowing down, a deceleration, and the detection distance.

\* \* \* \* \*